Feb. 10, 1953 C. RAY ET AL 2,628,010
APPARATUS FOR AUTOMATICALLY CONTINUOUSLY AND ALTERNATELY
SUPPLYING A FLOWABLE COMMODITY TO ALTERNATELY
MOVABLE CARTONS CARRIED IN PARALLEL LINES
Filed Jan. 2, 1948 12 Sheets-Sheet 1

FIG. 1.

CARLO RAY
DON RAY
Inventors

Attorney

Feb. 10, 1953 C. RAY ET AL 2,628,010
APPARATUS FOR AUTOMATICALLY CONTINUOUSLY AND ALTERNATELY
SUPPLYING A FLOWABLE COMMODITY TO ALTERNATELY
MOVABLE CARTONS CARRIED IN PARALLEL LINES
Filed Jan. 2, 1948 12 Sheets-Sheet 3

CARLO RAY
DON RAY
Inventors.

Attorney

Feb. 10, 1953 C. RAY ET AL 2,628,010
APPARATUS FOR AUTOMATICALLY CONTINUOUSLY AND ALTERNATELY
SUPPLYING A FLOWABLE COMMODITY TO ALTERNATELY
Filed Jan. 2, 1948 MOVABLE CARTONS CARRIED IN PARALLEL LINES
12 Sheets-Sheet 5

CARLO RAY
DON RAY
Inventors

Attorney

Feb. 10, 1953
C. RAY ET AL
2,628,010
APPARATUS FOR AUTOMATICALLY CONTINUOUSLY AND ALTERNATELY
SUPPLYING A FLOWABLE COMMODITY TO ALTERNATELY
MOVABLE CARTONS CARRIED IN PARALLEL LINES
Filed Jan. 2, 1948
12 Sheets-Sheet 7

CARLO RAY
DON RAY
Inventors.

By

Attorney

Feb. 10, 1953     C. RAY ET AL     2,628,010
APPARATUS FOR AUTOMATICALLY CONTINUOUSLY AND ALTERNATELY
SUPPLYING A FLOWABLE COMMODITY TO ALTERNATELY
MOVABLE CARTONS CARRIED IN PARALLEL LINES
Filed Jan. 2, 1948     12 Sheets-Sheet 10

CARLO RAY
DON RAY
Inventors

By

Attorney

Patented Feb. 10, 1953

2,628,010

UNITED STATES PATENT OFFICE 2,628,010

APPARATUS FOR AUTOMATICALLY CONTINUOUSLY AND ALTERNATELY SUPPLYING A FLOWABLE COMMODITY TO ALTERNATELY MOVABLE CARTONS CARRIED IN PARALLEL LINES

Carlo Ray, North Hollywood, and Don Ray, Beverly Hills, Calif.

Application January 2, 1948, Serial No. 298

5 Claims. (Cl. 226—99)

This invention relates to a carton-packaging machine.

The machine is designed to be used in connection with carton-opening machines in order that the apparatus may work automatically for receiving cartons in their collapsed form, opening the cartons and filling the cartons with such produce as desired. This machine is particularly adapted for cooperation with a carton-opening device, as illustrated and described in patent application, Serial No. 764,452, filed July 29, 1947 and issued as United States Letters patent No. 2,521,966. In order that the machine may operate continuously, there is provided a conveyor for delivering to the machine empty cartons set up having their bottoms closed. Most all of these cartons are of waxed material and are of a substantial nature. However, in order that such cartons may be filled and the produce therein compressed properly, it is necessary that these cartons be gripped firmly and moved from place to place in such a substantial position that they will not collapse or be subject to any deformation. Also, in packaging edible products, it is undesirable to use glue, and it is much more preferable to use flaps with interlocking tabs that will close the upper end of the container in any desirable manner. In accordance with my application, Serial No. 764,452, filed July 29, 1947, I have devised a mechanism for automatically interlocking flaps without the use of glue or other adhesive matters. This mechanism is equally adaptable with the present invention to close the top of the open carton. I have also found that it is desirable that in the packing of ice cream the operations be done singly, that is, one position for one operation and another position for the next operation. It is important that the carton at all times be supported in such a manner so that the carton will be maintained in rigid, upright position and capable of withstanding the pressure required in filling the carton.

It is significant that the flaps of the cartons be guided in a positive manner in order to obviate damaging of the cartons and increase the efficiency of the production. Quite frequently it is desired to package ice cream with a plurality of different flavors, generally in layers, where in the present instance the layers are positioned vertically. It is also advisable in the packaging of such commodities as ice cream that the ice cream is maintained in essentially flowable condition and at the same time prevent its liquidation. This requires quick, instant operation. In order to provide a machine which will continuously produce packaging of ice cream, I have found that intermittently transferring the ice cream from one package to the other on the opposite sides of a machine does not only increase the production but renders the apparatus efficient, positive and enables a pair of conveyors to cooperate one with the other in an alternate manner to produce a continuous flow of packed containers.

It is, therefore, one object of this invention to provide a machine that will positively grasp containers in such a manner that they may be packed with a commodity without distorting the container.

Another object of the invention is to provide an apparatus which will produce a continuous flow of containers supplied with the commodity for which they were designed.

A further object is to provide a machine for supplying a commodity to a container having means dependent upon the proper location of the container for regulating the supply source.

A still further object is to provide an apparatus for receiving empty cartons, having means for filling the cartons with a commodity and which will deliver the carton in closed, packaged condition.

Another object is to provide a machine having the above characteristics which will be automatic in operation and dependent upon the position of the container that is to be filled.

These and other objects will be made apparent throughout the further description of the invention when taken in connection with the accompanying drawings wherein like reference characters refer to like parts. It is to be distinctly understood that the herein-described apparatus is not only adapted for use with packaging of ice cream but is intended to be employed for filling containers for distributing any sort of a commodity. The drawings are not a definition of the invention but illustrate a manner in which the invention may be effectuated. The invention is defined by the appended claims.

Referring to the drawings.

Figure 1:
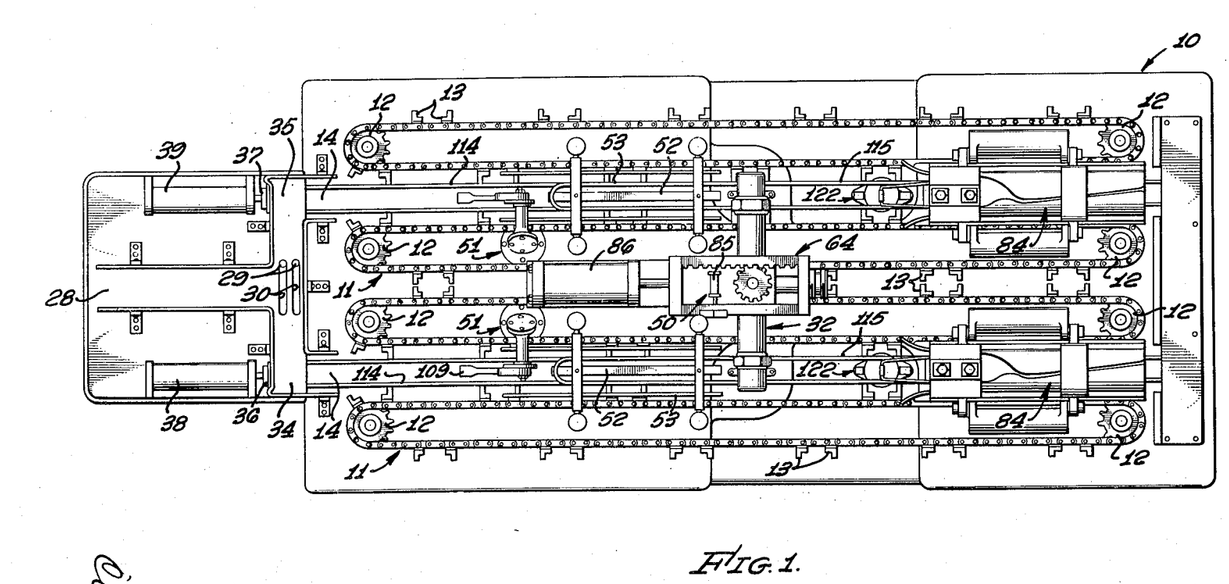
Fig. 1 is a top plan view of an apparatus embodying the present invention.
Figure 2:
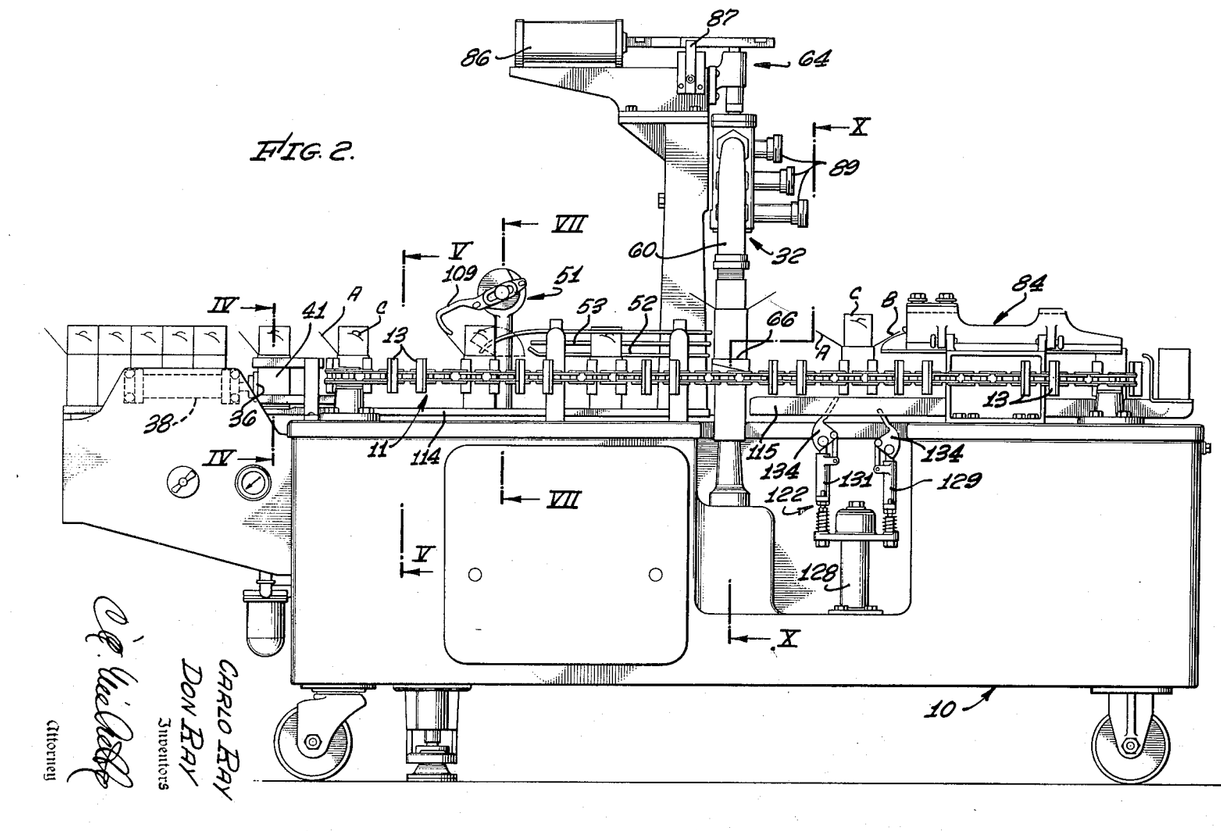
Fig. 2 is a side elevational view of the mechanism shown in Fig. 1.
Figures 3, 4:
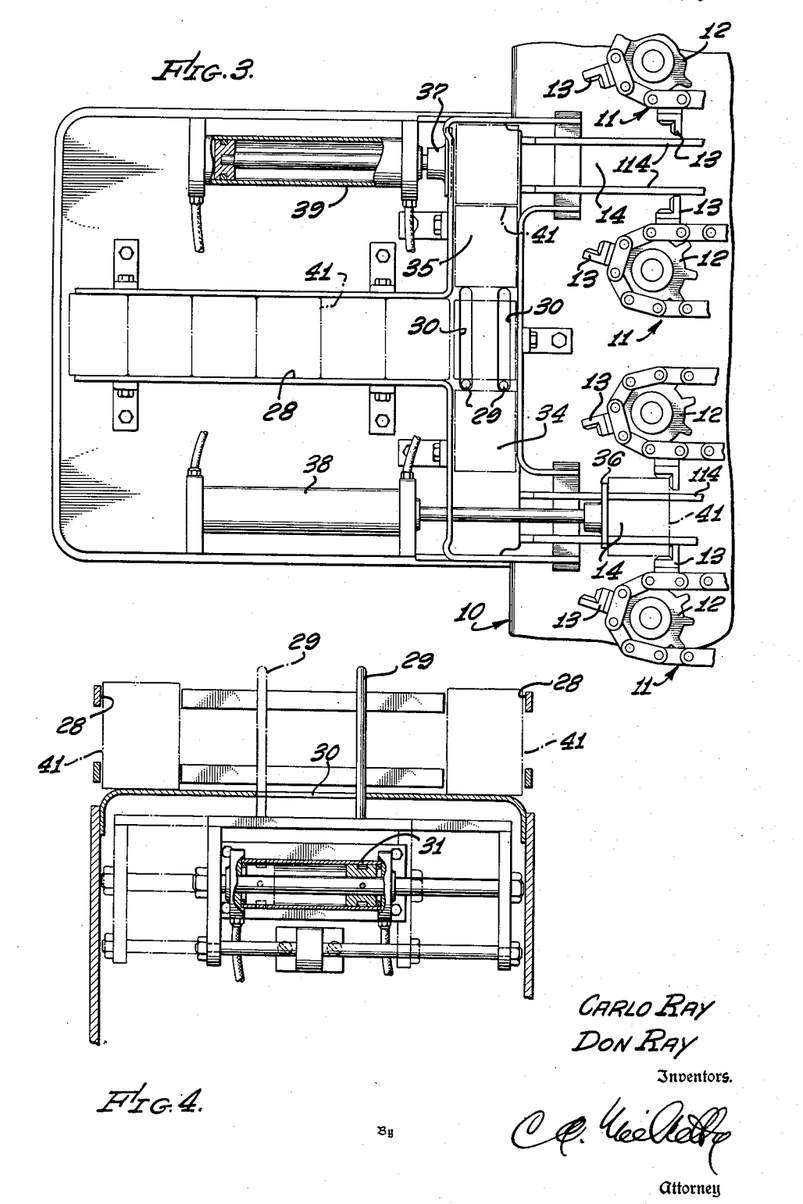
Fig. 3 is an enlarged top plan view of a fragment of Fig. 1.
Fig. 4 is a sectional view taken along the line IV—IV of Fig. 2.

Referring to the drawings:

There is provided a supporting structure, represented in its entirety by 10. Mounted on the supporting structure are two conveyors, each represented in its entirety by 11. Each conveyor consists of a pair of horizontally disposed, endless chains carried by end sprockets 12. The sprockets 12 are geared so that each pair of chains operates simultaneously. The chains of each conveyor operate in opposite directions to its companion chains. Carried by the conveyor chains are angle members 13 spaced apart the proper distance for receiving and grasping the corners of a carton. It can be understood from the drawings that as the cartons are fed onto a passageway 14 (see Fig. 3), the angle members 13 will be spread apart in accordance with the circumference of the sprocket wheels 12 and as the chains straighten out from the sprocket wheels 12, the angle members 13 will square themselves into right-angular position for receiving a square carton.

It is desirable that each of the aforementioned pairs of conveyors operate alternately one with the other, the purpose of which will be later understood.

Means is provided for actuating the device, which preferably consists of a continuously operated motor 15 (see Fig. 20) having a pair of pulleys 16 and 17. These pulleys 16 and 17 are drivably connected to pulleys 18 and 19, respectively. The pulleys 18 and 19 are connected by way of clutches 21 and 22 to cam shafts 23 and 24. The clutches 21 and 22 are preferably electrically-operated, one-revolution clutches. On each of the cam shafts is provided a plurality of cams 25 for actuating valves 26. The valves 26 may be of a conventional type to supply air to fluid pressure cylinders. The valves 26 are, of course, timed for energizing the various cylinders which are particularly designed to fill their specialized offices.

As pointed out above, cartons which have been squared with their bottoms closed and in upright position are fed along the passageway 28, and from the passageway 28 the cartons are alternately shifted one at a time into alignment with passageways 14 by pins 29 movable in slots 30, the pins being actuated by an air cylinder 31, the latter being in timed relation for alternately positioning cartons in alignment with the two conveyors. The angle members 13 which grasp the sides of the carton are spaced on the conveyors at a distance which is equal to the distance that the conveyor travels during one revolution of cam shafts 23 or 24. The two conveyors operate alternately in order to feed the cartons to opposite sides of a dispenser, represented in its entirety by 32. As the pins 29 alternately shift the cartons from the passageway 28 to the passageways 34 and 35, there are provided fluid-operated pushers 36 and 37. These pushers 36 and 37 are operated by air cylinders 38 and 39 for alternately shoving or pushing a carton 41 onto passageway 14, at which time it is picked up by the angle supports 13 and carried from station to station as defined by the distance between the cooperating angle members 13.

It is, of course, necessary that the flaps be in open position in order to receive the commodity with which the carton is to be filled, and when in open position, sufficient guides must be provided to maintain the flaps in the proper position so that the commodity may be delivered into the container. In order that the flaps may be properly positioned in open position, there is provided a cam-operated mechanism, represented in its entirety by 51, arranged to position the flaps of the carton into engagement with guides 52 and 53, the guides 52 operating to receive the incoming flap while the guides 53 engage the oppositely disposed flaps and maintain them in vertical, open position. The mechanisms 51 are arranged in timed relation with the movement of the conveyors to position the flaps for engagement with the guides 52 and 53. The cam mechanisms 51 will be later described.

It is desirable that means be provided for preventing dispensing of a commodity in the absence of a container to receive the same, and it is an important feature of this device which provides means for controlling the operation of the device by the cartons to be filled. In other words, in the absence of a carton or a container in the position to be filled, the device is rendered inoperable. This is accomplished by microswitches 56 and 57 positioned on the opposite sides of the dispenser 32, later to be described. The dispenser 32 may be of any particular design and arranged to supply a plurality of different commodities, as for instance, in the packing of ice cream it is often desirable to provide different layers of ice cream of different flavors.

Figure 10:
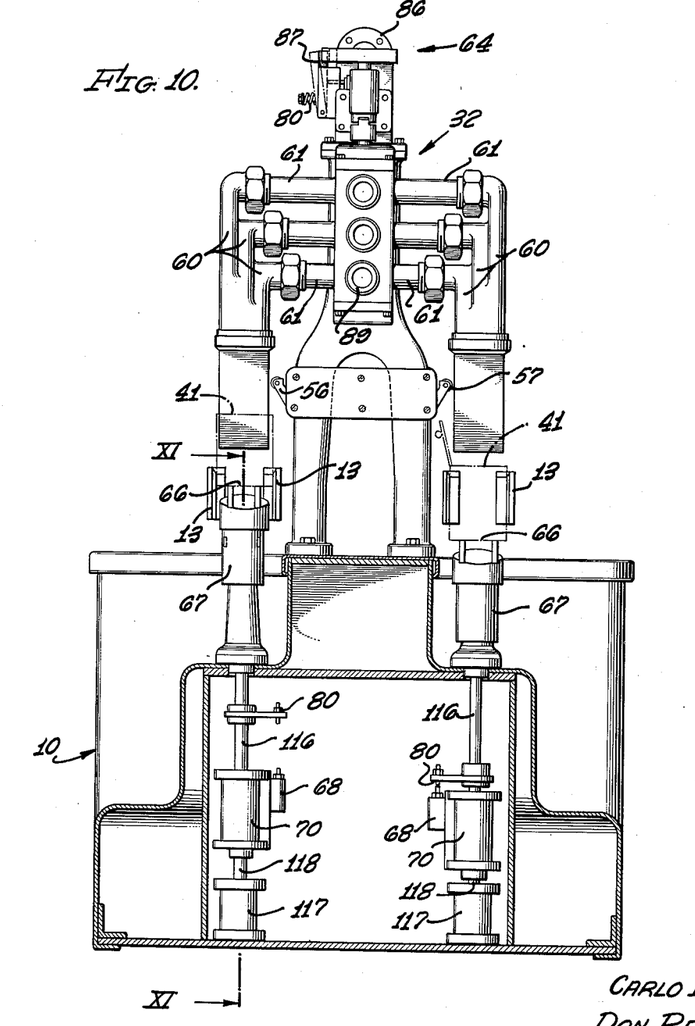
Fig. 10 is a sectional view taken along the line X—X of Fig. 2.
Figure 15:
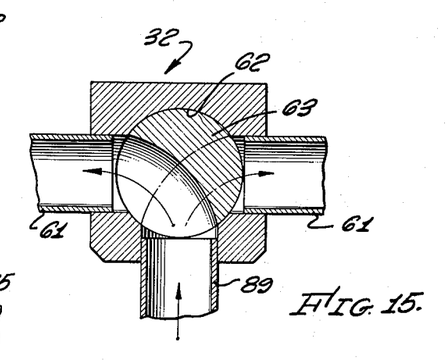
Fig. 15 is a sectional view taken along the line XV—XV of Fig. 14.
Figure 16:
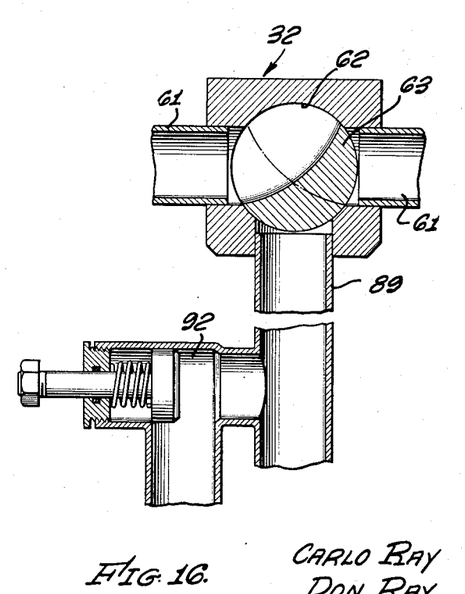
Fig. 16 is a view similar to Fig. 15 illustrating a detail of the invention.

This is accomplished by a plurality of oppositely disposed passageways 61 (see Fig. 10), either of which may be utilized for supplying a commodity to a carton by way of separate passageways or spouts 60. Preferably, there is provided a valve for alternately supplying a commodity to the passageways 61 on the opposite sides of the dispenser 32. Such a valve may consist of a vertical bore 62 in the dispenser 32 having a valve member 63 (see Figs. 15 and 16) turnable therewithin and arranged to alternately close the passageways 61 on the opposite sides of the dispenser 32. Means, represented in its entirety by 64, is provided for alternately connecting the dispenser 32 with the passageway 61 on the opposite sides of the dispenser 32. The means 64 will be later described.

Figure 12:
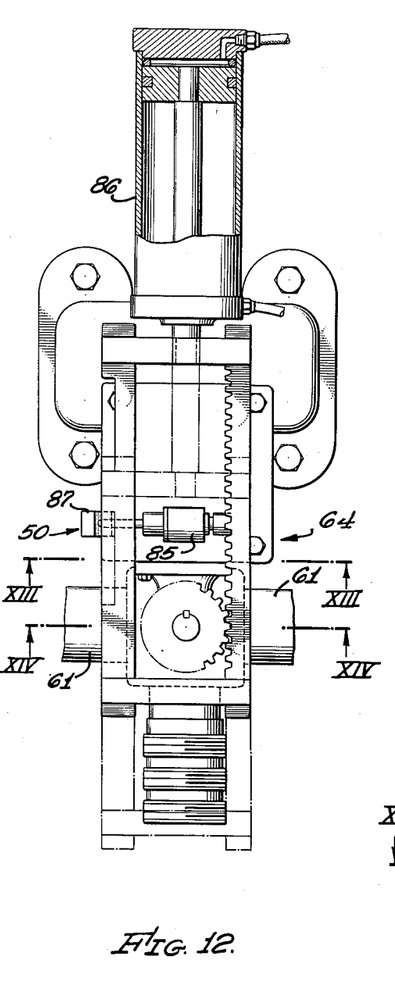
Fig. 12 is an enlarged, sectional view of a detail of the invention.
Figure 13:
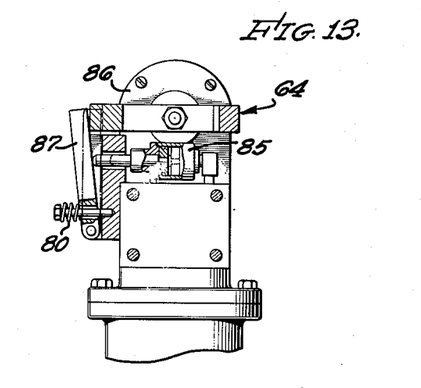
Fig. 13 is a sectional view taken along the line XIII—XIII of Fig. 12.
Figure 14:
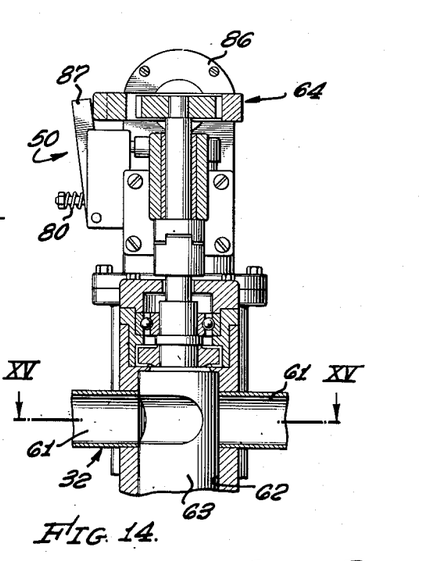
Fig. 14 is a sectional view taken along the line XIV—XIV of Fig. 12.

Means 50 is also provided for rendering the means 64 inoperable and for closing the openings or passageways 61 on both sides of the dispenser 32 when a receptacle or carton is not in a position for receiving a commodity. The means 50 includes microswitches 56 and 57 (see Figs. 12 and 20) actuatable by the tabs of cartons to be filled. These microswitches are connected in series with an electrical circuit 4 connected with a solenoid-actuated valve 69 for rendering the means 64 inoperable when and if there is no carton to receive the commodity.

As pointed out above, the operation of the machine is dependent upon the cartons being filled at stations 66 (see Fig. 10) on each side of the dispenser 32. At each of the stations 66 supporting the cartons to be filled there is provided a fluid pressure cylinder 70, responsive to the weight of the filled cartons for lowering a support 67 on which the carton is supported. As the carton-supporting member 67 approaches its lowermost position, there are arranged electrical contacts for energizing one or the other of the microswitches 68 associated with the one-revolution clutches 21 and 22. The microswitches 56 and 57 are connected in an electric circuit for actuating the solenoid 69 for bypassing the fluid pressure through the exhaust 71 when and if there is no carton on the opposite side of the dispenser 32 to receive the commodity and to close the valve 32 by operating means 64.

It may be well to point out here that in the operation of the device there are four separate circuits, each one complete in itself and independent of any other circuit. A main switch 91 serves to connect or disconnect all four circuits with the power source 5 simultaneously.

Circuit 1 is for the motor 15 which operates continuously and, through suitable pulleys, drives clutches 21 and 22. These clutches are normally disengaged so that the right-hand and left-hand cam shafts 23 and 24, respectively, do not rotate.

Circuit 2 is through the microswitch 68 on the right-hand lift cylinder 70 and solenoid 21A. This microswitch 68 is normally open. When a carton on the righthand side of the machine is being filled, the piston in the right-hand lift cylinder 70 is depressed by the flow of the ice cream into the carton being filled, and an adjusting screw 80 is arranged to contact the microswitch for closing the circuit 2 and energizing the solenoid 21A, thereby engaging the clutch 21 for one revolution only of the cam shaft 23.

Circuit 3 is identical to circuit 2 and connects corresponding parts on the left-hand side of the machine. One cycle each of the right-hand cam shaft 23 and the left-hand cam shaft 24 completes the cycle of the whole machine.

Figure 20:
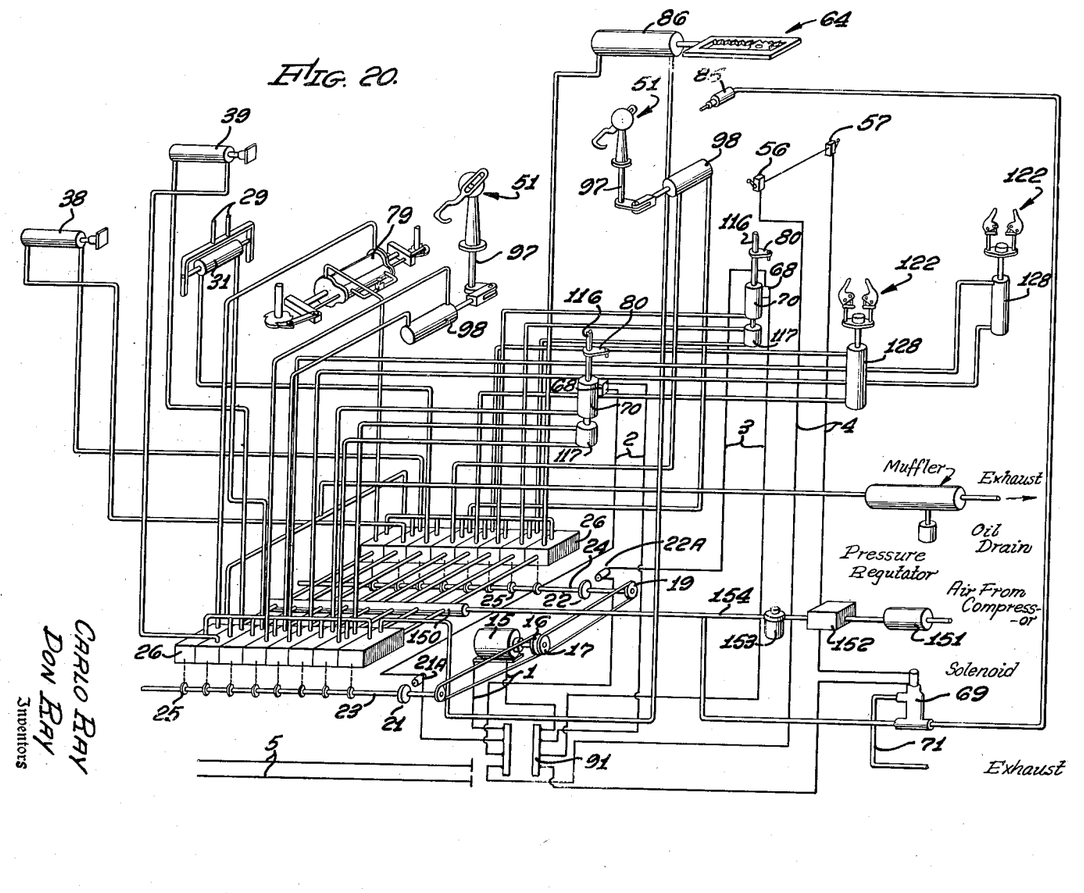
Fig. 20 is a diagrammatic illustration of the electrical circuits and fluid pressure means employed in the system.

Circuit 4, which contains the microswitches 56 and 57, is to control the means 50 for rendering the valve-actuating means 64 inoperable when a carton is not in position for receiving ice cream and does not enter into a normal cycle of operation. The means 50 includes microswitches 56 and 57. These microswitches 56 and 57 are normally closed and are wired in series with the solenoid valve 69. As illustrated in Fig. 20, solenoid 69 will be energized when both microswitches 56 and 57 are closed. However, in actual operation, at the end of a cycle of the right-hand cam shaft 23, an empty carton has been placed in position under the right-hand filling spout 60, and one of the flaps of this carton operates to open microswitch 56 so that the solenoid 69 is not energized. At this same instant, ice cream is flowing through the left-hand filling spout 60 and the left-hand carton is being depressed. Microswitch 57 is likewise held in open position by its associated carton flaps. As this left-hand carton is being depressed, its flap will come out of contact with microswitch 57, permitting the switch to close. The timing is such that before this happens, the right-hand carton has come up into position and the switch 56 has been open by a flap of the carton. Thus, in the normal operation of the machine, one or both of the microswitches 56 or 57 is always open and solenoid 69 is not energized.

In the event that an empty carton is crushed, damaged or improperly placed under either of the left-hand or right-hand filling spouts 60, the flap of the carton will not engage the microswitch and the circuit will remain closed. For example, assume that a carton is being filled on the right-hand side of the machine. Upon completion of its fill, circuit 2 is closed and the right-hand cam shaft 23 makes its cycle. The first action taking place during this cycle is that the valve mechanism 32 operates to divert the flow of ice cream from the right-hand filling spout 60 to the left-hand spout 60, where a carton is in place to receive the ice cream. Effectively, the last action occurring is the placing of an empty carton under the right-hand filling spout. Should this carton be crushed or improperly placed under the spout, the mechanism operates to prevent flow of ice cream to this damaged carton.

Microswitch 57 closes when the carton on the left-hand side is approximately one-half full and is being pushed downwardly by the weight of the ice cream in the carton. Circuit 4 is at this instant closed and solenoid 69 is energized. By following the piping diagram in Fig. 20, it will be seen that the solenoid valve 69 exhausts the fluid pressure which is normally under pressure in a small cylinder 85 located adjacent the ice cream valve-operating mechanism 64. The release of air pressure on this cylinder permits a spring 80 to retract the piston of this cylinder. This spring 80 also forces engagement of a latch 87 into engagement with a rack in the filler valve-operating mechanism 64 and prevents its normal operation. Upon completion of the filling of the left-hand carton, circuit 3 is closed and the left-hand cam shaft makes its cycle. As on the right-hand side, the first that occurs is the operation of the ice cream filler valve 32 to divert the flow of ice cream from the left-hand spout, the ice cream being supplied to the filler valve 32 by way of the passageways 89. Since the circuit 4 has already been closed and the latch 87 has engaged the filler valve-operating mechanism 64, the latter is permitted only partial operation instead of its normal complete stroke, and the ice cream filler valve 32 is moved to an intermediate closed position and in register with a discharge port 92 (see Fig. 16) for diverting the ice cream to a bulk receptacle outside of the machine and not a part of the machine. The left-hand cam shaft 23 completes its cycle and places an empty carton under the left-hand filling spout 60, opening microswitch 57 and returning the latch 87 to its normal disengaged position with respect to the filler valve operating mechanism 64. This has not affected the filler valve 32, which is closed. Ice cream is not flowing from the machine and, therefore, no further action can occur.

The damaged carton on the right-hand side of the machine must be removed by hand. The piston of the right-hand lift cylinder 70 must be depressed by hand for closing circuit 2 and starting the cycle of the right-hand cam shaft 23. This cycle will cause the opening of the ice cream filler valve 32 with the flow directed to the left-hand spout and an empty carton will be placed under the right-hand filling spout. Thus, the machine is again in normal operation.

Figure 5:
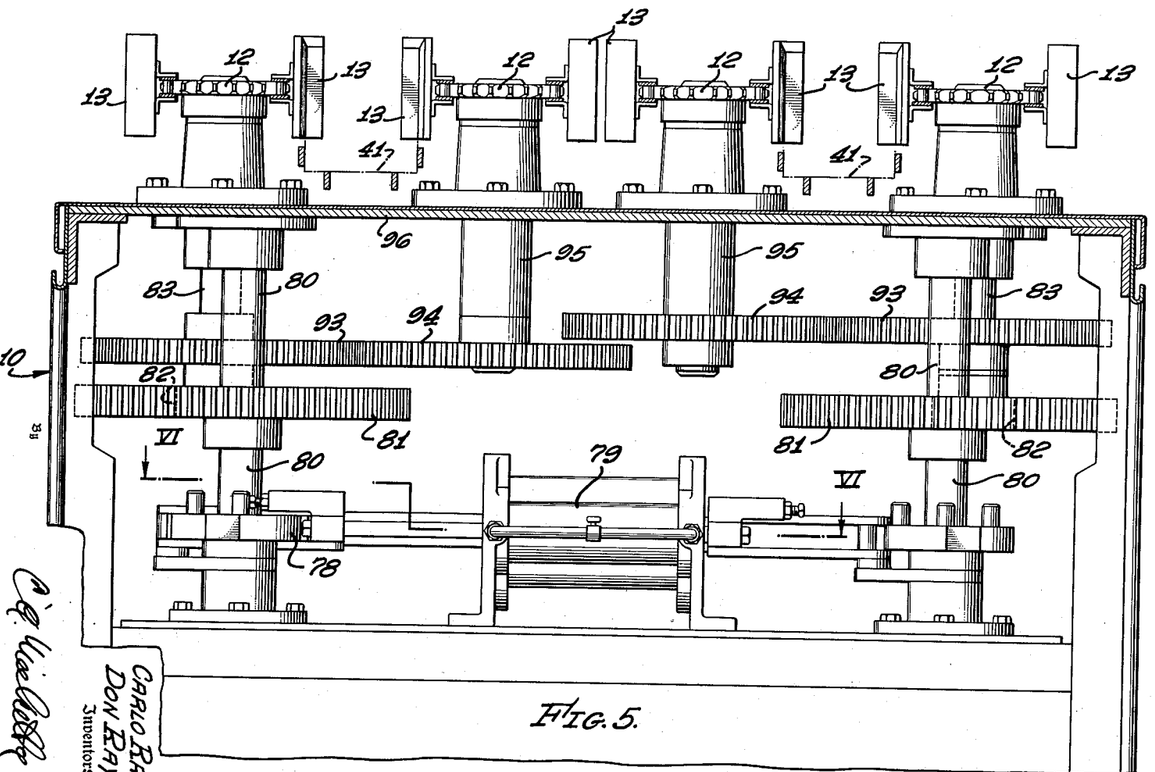
Fig. 5 is a sectional view taken along the line V—V of Fig. 2.
Figure 6:
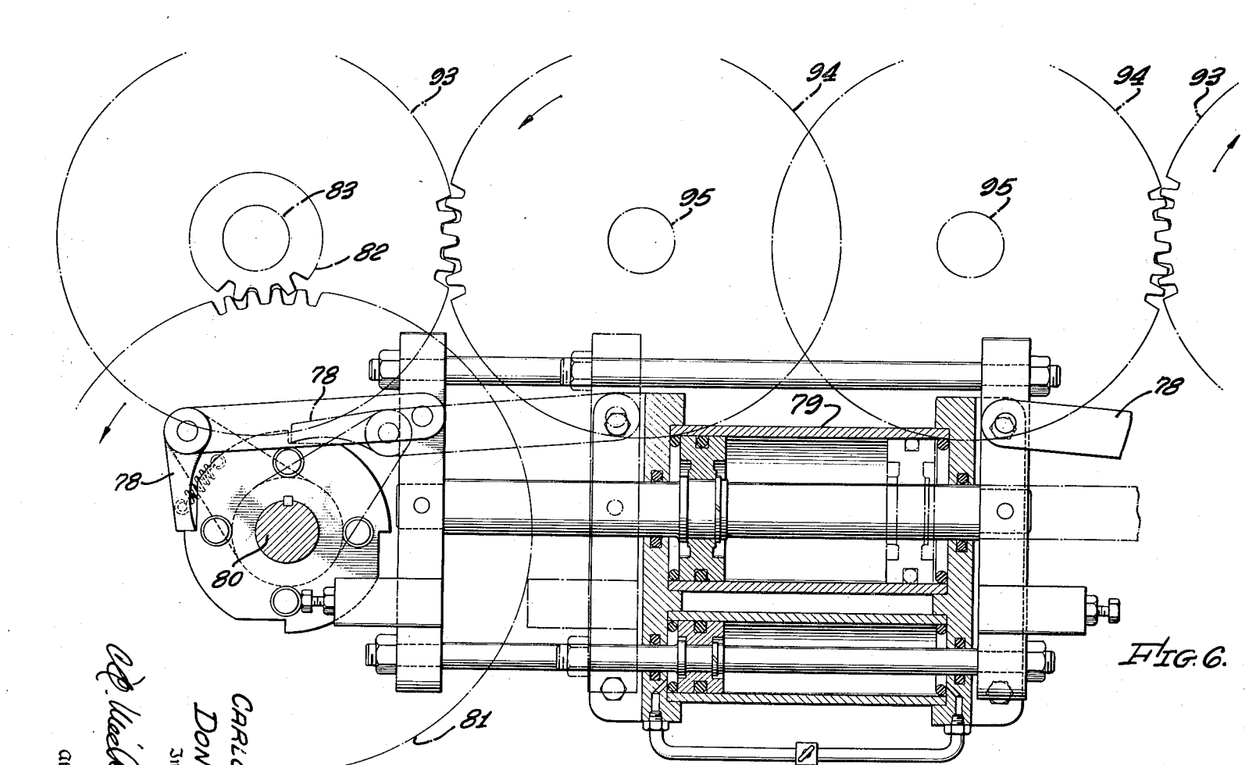
Fig. 6 is a sectional view taken along the line VI—VI of Fig. 5.

Means is provided for alternately moving the conveyors 11 from station to station (see Figs. 5 and 6), which means comprises oppositely disposed ratchets 78 actuated by air cylinder 79. Each of the ratchets 78 is arranged to rotate a shaft 80 carrying a gear 81 one-quarter revolution, the gears 81 being meshed with gears 82 carried by vertical shafts 83. The gears 82 are one-quarter the size and contain one-fourth the number of teeth on the gears 81, so that the gears 82 will rotate 360° upon the turning of the gears 81 90° by the ratchets 78, the latter being actuated by the air cylinder 79, which is in controlled, timed relation with its associated valve 26 for alternately actuating the oppositely disposed ratchets 78.

Each of the shafts 83 is provided with a gear 93, which meshes with a companion gear 94, the latter being carried by a vertical stub shaft 95. Each of the shafts 83 and 95 extends through and is supported by horizontal supporting members 96 carried by the frame 10. The upper ends of shafts 83 and 95 carry the end sprockets 12 for engagement with and cooperating with the chains of the conveyors 11. Since the gears 93 mesh with the gears 94, the gears 93 and 94 will rotate in opposite direction, and accordingly by way of their respective shafts, the end sprockets 12 of each conveyor will operate in opposite directions and thereby turn the adjacent sides of the conveyor cooperating chains in the same direction. The fluid pressure cylinder 79 which operates the oppositely disposed ratchets 78 is in timed relation with its associated cam 25 and valve 26 for alternately actuating the ratchets 78 to turn their respective associated shafts 83, whereby the conveyors are alternately moved the distance corresponding to one revolution of their associated sprocket wheels 12.

Figure 7:
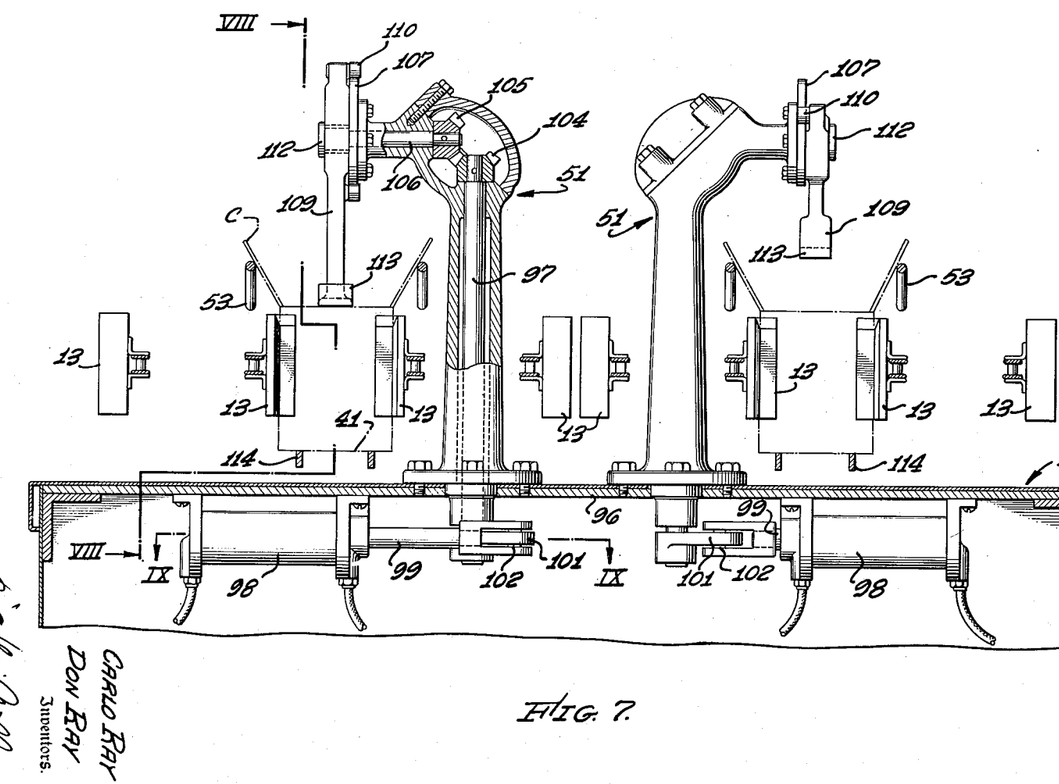
Fig. 7 is a sectional view taken along the line VII—VII of Fig. 2.
Figure 8:
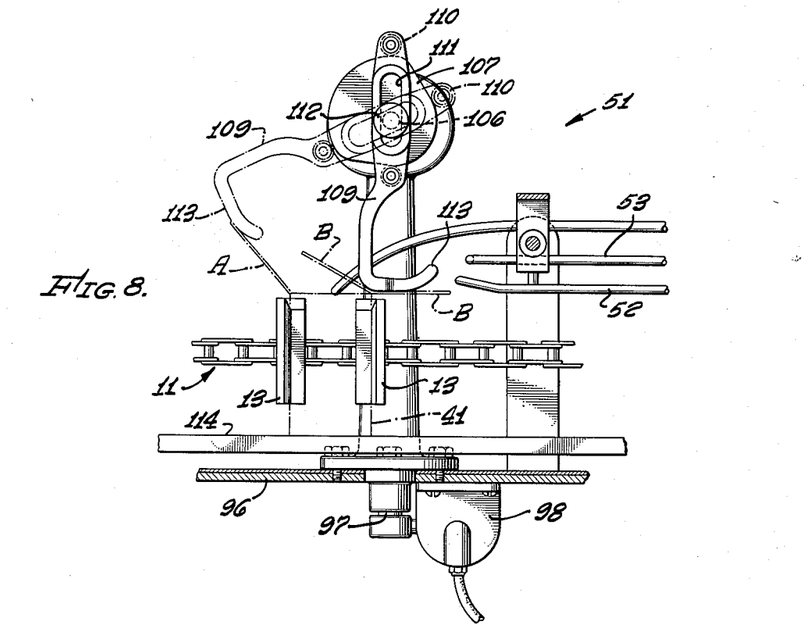
Fig. 8 is a sectional view taken along the line VIII—VIII of Fig. 7.
Figure 9:
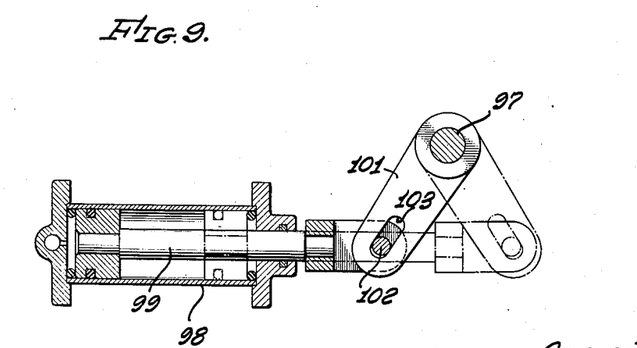
Fig. 9 is a sectional view taken along the line IX—IX of Fig. 7.

The means 51 for positioning the flaps under the guides 52 and 53 for maintaining the flaps in open position when the carton is delivered to the filling station 66 consists of a vertical shaft 97 (see Figs. 7, 8 and 9). The shaft 97 is supported by the horizontal supporting member 96 carried by the frame 10 and arranged to be rotated by fluid pressure cylinder 98, the piston rod 99 of the cylinder 98 having its free end connected to a link 101 by means of a pin 102. The pin 102 extends into a slot 103 in the link 101 for permitting relative movement between the pin 102 and the link 101.

The other end of the link 101 is fixed to the shaft 97, whereby upon oscillation of the piston rod 99 by the fluid pressure cylinder 98, the shaft 97 will accordingly be oscillated. The upper end of the shaft 97 is provided with a beveled gear 104 arranged to mesh with a beveled gear 105 carried by one end of a horizontal shaft 106. The other end of the horizontal shaft 106 is provided with a cam 107 adapted to actuate a vertical arm 109, the arm 109 being provided at its upper end with a roller 110 for cooperating with the cam 107 for lifting the arm during its upward movement and lowering the arm during its downward movement. It can be seen from Fig. 8 that the arm 109 is provided with a slot 111 arranged to cooperate with and receive a positioning pin 112 carried by the cam 107 for permitting relative movement of the arm 109 in accordance with the cooperating cam 107 and roller 110. During the upward movement of the arm 109, the free end of which terminates in a finger portion 113, the latter will urge the flap A in the opposite direction to the travel of the conveyor 11, and during the return of the arm 109, the finger 113 will engage the flap B and move it to the position shown at B', so as the conveyor moves to the next station, the flap B will be moved under the guide 52 and maintained in a substantially horizontal open position. The flaps C and D carried by the opposite edges of the carton will engage the guides 53 and be maintained in a substantially vertical position, and as the conveyor moves forward, the flap A will be engaged by the guide 52 and maintained in a substantially horizontal position. When the flaps leave the guides 52 and 53, the carton is in position on station 66 and in alignment with the filling spout 60 for receiving the ice cream or other product with which the carton is being filled.

Figure 11:
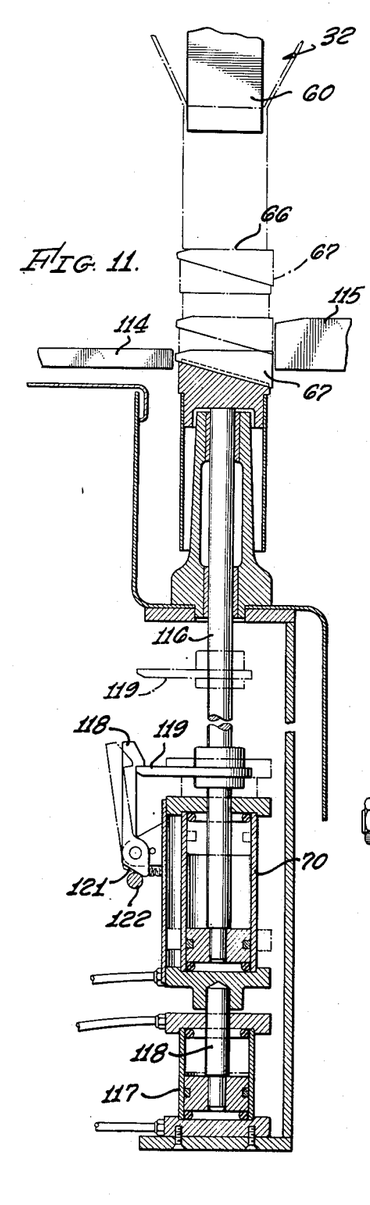
Fig. 11 is a sectional view taken along the line XI—XI of Fig. 10.

Referring to Fig. 11, each of the conveyors is provided with carton guide rails 114 leading from the entrance of the conveyor to the filling station 66, and an additional guide rail 115 leading from the station 66 on the conveyor to the end of the conveyor. The guide rail 115 is slightly raised in elevation from the guide rail 114, the purpose of which will be later understood. The carton lift cylinder 70 on each side of the machine is provided with a piston rod 116 arranged to raise the carton into receiving position with the filling spout 60. Each of the cylinders 70 is provided with an exhaust or vent for permitting the fluid pressure to escape from the cylinder 70 in response to the weight of the ice cream delivered to the carton. The conveyors are so timed that when the bottom of the carton is depressed by the weight of the ice cream to the level of the uppermost plane of the guide rail 115, the filled carton is moved forward by the conveyor. Inasmuch as a certain amount of ice cream will depend from the mouth of the filling spout 60, it is necessary that the incoming carton be somewhat lower than the mouth of the filling spout 60. To this end there is provided a second cylinder 117 positioned below the cylinder 70 and having a piston rod 118 arranged to support and raise the cylinder 70 subsequent to the upward stroke of the piston rod 116. Therefore, when the fluid pressure is released from both the cylinders 70 and 117, the carton filling station 66 will be lowered to the level of the guide rail 114, thereby positioning the carton below the mouth of the filling spout 60. This is necessary in order to compensate for the ice cream that may be depending from the mouth of the filling spout. In operation, the timing is such that the fluid cylinder 70 operates prior to the fluid cylinder 117.

For the purpose of positively effecting the downward movement of the piston rod 116, there is provided a ratchet 118 arranged to engage the latch 119 carried by the piston rod 116. The latch 119 will be engaged by the ratchet 118 when the ratchet 118 is in its uppermost position, and as the ratchet 118 is moved to its lowermost position by the lowering of the cylinder 70, the piston rod 116 will be brought downwardly and the station 66 will be moved into parallel relation with the guide rail 114. As the piston 70 reaches its lowermost position, the cam surface 121 provided on the lower end of the ratchet 118 will contact a stop or cam 122 carried by the fixed supporting structure 10, operating to disengage the ratchet 118 from the latch 119, whereby the piston rod 116 is free to move upwardly during its next cycle of operation.

Figure 17:
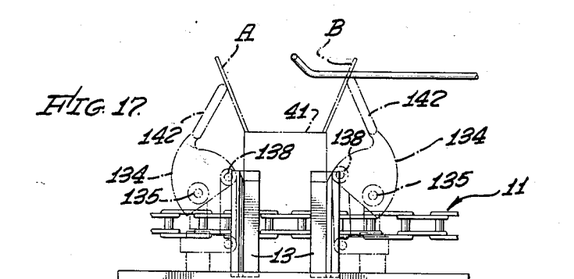
Fig. 17 is a detailed view showing the flap-manipulating means in two positions of operation.
Figures 18, 19:
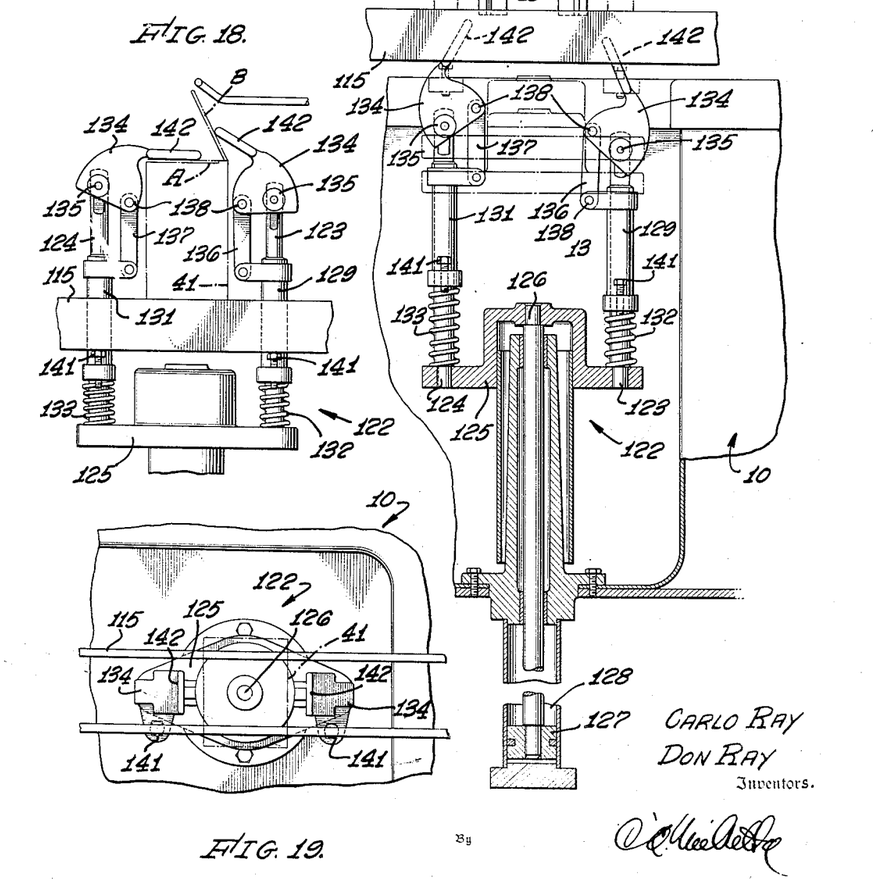
Fig. 18 is similar to Fig. 17 showing the flap-manipulating means in an intermediate position.
Fig. 19 is a top plan view of Fig. 18.

As the filled carton is moved from the filling spout 60 to its next station, means is provided for folding the flaps A and B inwardly over the top of the carton. This means, represented in its entirety by 122, may consist of a pair of vertical shafts 123 and 124 (see Figs. 2, 17, 18 and 19) supported on opposite sides of a block 125, the block being carried by the upper end of a piston rod 126, the piston rod 126 being fixed to a piston 127 disposed in a fluid pressure cylinder 128. A pair of tubular sleeves 129 and 131 are slidably carried about the upper end of the shafts 123 and 124, respectively. These sleeves 129 and 131 are biased upwardly by means of springs 132 and 133, respectively. The upper ends of each of the shafts 123 and 124 are arranged to support an arcuate-shaped member 134. The arcuate-shaped members 134 on the shafts 129 and 131, respectively, are disposed in opposite directions. Each of the arcuate-shaped members 134 are pivoted off center to the upper ends of the shafts 123 and 124, as shown at 135. The innermost portion of the arcuate shaped members 134 are connected to the sleeves 129 and 131 by means of levers 136 and 137, as shown at 138, so that as the shafts 123 and 124 are moved upwardly, the projections or pins 141 carried by the lower end of the sleeves 129 and 131 will engage the framework 10 and prevent further upward movement of the sleeves and cause the arcuate-shaped members 134 to rotate about their pivot points 135 and bring the fingers 142 carried by each of the arcuate-shaped members 134 into engagement with flaps A and B and folding them into overlapping, closed position, as clearly illustrated by Figs. 17 and 18. The fingers 142 operate to clamp the scored connection between flaps and the top of the carton, and subsequent to the downward movement of the piston rod 126, the carton is moved forward and the flaps A and B pass under a shoe in the flap-interlocking means 84, and during subsequent movement of the conveyor, the filled carton passes out of the means 84 with the flaps in interlocking, closed position.

Means is provided for folding and interlocking the flaps for closing the top of the carton. It is necessary, however, that opposite flaps be folded over in superimposed relation, and the adjacent cooperating flaps, one of which contains a slot and the other of which contains a tongue for engaging the slot in the cooperating flap, which means is illustrated and described in our above-mentioned application, except the flap-interlocking means is positioned at 90° from the position of the flap-folding means disclosed in said application. The flap-folding mechanism consists of a plow 84 illustrated and described in our aforementioned application.

The fluid pressure is supplied to the various cylinders by way of the valves 26 from a supply chamber 150, the supply chamber 150 being supplied with fluid under pressure by way of an air compressor 151, pressure regulator 152 and air lubricator 153, the latter being connected with the supply chamber 150 by way of the pipe 154. It is important that the various cams 25 carried by each of the cam shafts 23 and 24 be formed to actuate their respective valves 26 for energizing the fluid pressure cylinders in their proper sequence. As above explained, the first operation of each cycle is the energization of the right-hand cylinder 86 for actuating the means 64 for diverting the flow of ice cream by means of the valve mechanism 32, to the left-hand filling spouts 60. Each of the flap-manipulating means 51 and 122 are actuated by their respective cylinders 98 and 128 prior to the actuation of cylinders 79 for alternately moving the conveyors 11. In other words, the conveyor is stationary during the actuation of the valve-manipulating means 51 and 122. Also, the cylinders 38 and 39 are actuated just prior to the energization of cylinders 79 for moving the associated conveyor from one station to the other. The cylinder 31 is timed to actuate the pins 29 in opposite directions for alternately moving a carton in alignment with the conveyor passageways 14. The actuation of cylinder 31 may be simultaneous with the actuation of cylinder 39 to move a carton in alignment with the pusher cylinder 38 and conversely, the cylinder 31 may be energized simultaneously with the cylinder 38 for pushing a carton in alignment with pusher cylinder 39, it being primarily important that the cylinder 86 be energized prior to the other cylinders for actuating the supply valve 32. Thereafter, all the other fluid-actuated cylinders, except the cylinder 79, operate while the conveyors are stationary. It is to be understood, however, that the sequence of operation and the piping arrangement as illustrated in Fig. 20 may be varied without affecting the operation of the machine, as above described.

Accordingly there is provided an apparatus for packaging a commodity such as ice cream or the like, wherein the container or carton is positively supported at all times during the filling operation. The apparatus is rendered inoperable at such times as there is no container for receiving the commodity being packaged. The apparatus is comparatively simple, is positive in operation, foolproof and comparatively cheap to manufacture. While we have illustrated and described the present invention in connection with packaging ice cream, it may be employed for packaging other commodities of a similar nature. A preferred form of the invention has been illustrated and described, but it is expected that a person skilled in the art could make changes, substitutions, omissions and additions in the exemplary form here illustrated and described without departing from the spirit and scope of the appended claims.

We claim:

1. In an apparatus for packaging a flowable commodity into cartons each having one open end and arranged to be closed, the combination of: a pair of conveyors arranged in parallel relationship, each conveyor including a pair of endless belts with the lays of said belts lying in a common plane; means for intermittently and alternately moving the belts of each conveyor so that adjacent lays travel in the same direction; means at one end of said pair of conveyors for feeding cartons alternately to said conveyors; a single supply means between said conveyors and having divergent passageways for directing flow of different commodities to cartons on said conveyors and provided with valve means alternating flow of commodities to cartons on said conveyors for supplying a plurality of different commodities to each carton on said conveyors in alternate order, and switch means on opposite sides of said supply means actuated by said cartons when in filling position for coordinating the actuation of the moving means, carton-feeding means and commodity-supplying means.

2. An apparatus for packaging ice cream, including a pair of horizontally spaced conveyors, each of said conveyors including a pair of cooperable endless chains disposed in the same horizontal plane and having adjacent lays, means for moving the chains so that adjacent lays of each pair of chains move in the same direction, means carried by each pair of chains for holding cartons to be filled, the carton-holding means being disposed in predetermined spaced relation, means for alternately moving each conveyor a distance equal to the distance between said carton-holding means, means for alternately feeding cartons to the carton-holding means, a supply means located between said conveyors, and means including a passageway communicating with said supply means and divergent passageways, each leading to cartons carried by a conveyor, and valve means between the divergent passageways operable to supply alternately and by virtually continuous flow from said supply means a commodity to be packed in cartons carried by said conveyors.

3. In an apparatus for automatically supplying a commodity to cartons each having an open end provided with closing flaps, the combination of: a pair of conveyors, means for alternately moving said conveyors a predetermined distance, means associated with each of said conveyors for supplying a commodity to cartons carried by said conveyors, said supplying means including a supply source between said conveyors including a feed passageway leading from said source and sidewardly directed passageways in communication with said feed passageway and leading to cartons on said conveyors, valve means operable in said feed passageway and between said sidewardly directed passageways for alternately and continuously supplying the commodity to cartons carried by said conveyors, and means including a switch normally actuatable by each carton when in filling position and non-actuable for rendering said supplying means inoperable when a carton is not in position for receiving a commodity being supplied.

4. A carton-filling device including a pair of conveyors, each of said conveyors being provided with spaced means for holding cartons to be filled, means for alternately moving said conveyors a predetermined distance, means for alternately supplying cartons to said conveyors, the said carton having one open end provided with integral flap closures, means for arranging said flap closures in open position for receiving a commodity at a filling station, means including a passageway in communication with divergent passageways, each leading to cartons carried by a conveyor, and valve means operable in said first named passageway for continuously supplying a commodity alternately to cartons at said filling stations, and means including switch means at each filling station cooperable with a flap closure for automatic operation of said conveyor-moving means, the valve means of said commodity-supplying means and carton-supplying means.

5. In an apparatus for automatically packaging a commodity in cartons, the combination of: a pair of horizontally disposed, parallel, spaced conveyors adapted to advance cartons along parallel spaced paths, each conveyor comprising a pair of cooperable endless chains having adjacent lays disposed in spaced, parallel, vertical planes and movable in the same direction along said paths, means on each pair of chains for carrying cartons to be filled in predetermined spaced relation, means at one end of said pair of conveyors for supplying cartons alternately thereto, means including guide members cooperable with flap closures of each carton for holding said flap closures in open position during travel to a filling station, a commodity supply means disposed between said paths of travel and operable to alternately cause flow of a commodity to cartons at each filling station, said commodity supply means including a passageway to each conveyor and a valve member controlling flow to both passageways, means at each filling station responsive to cartons positioned thereat for selectively controlling said valve and flow of said commodity along said passageways, and driving means for moving the conveyors alternately and intermittently to position the cartons at the filling stations, said carton-responsive means at each filling station being operable to actuate said driving means.

CARLO RAY.
DON RAY.

REFERENCES CITED

The following references are of record in the file of this patent:

UNITED STATES PATENTS

| Number | Name | Date |
| --- | --- | --- |
| 602,282 | Campbell et al. | Apr. 12, 1898 |
| 615,493 | Richards | Dec. 6, 1898 |
| 1,712,775 | Mudd | May 14, 1929 |
| 1,729,991 | Bond | Oct. 1, 1929 |
| 2,082,567 | Bleam | June 1, 1937 |
| 2,206,279 | Ferguson | July 2, 1940 |
| 2,206,761 | Bergstein | July 2, 1940 |
| 2,208,028 | Harrington | July 16, 1940 |
| 2,266,979 | McIlvried | Dec. 23, 1941 |
| 2,296,802 | Thompson | Sept. 22, 1942 |